United States Patent [19]

Brumfield et al.

[11] 4,107,530
[45] Aug. 15, 1978

[54] INFRARED ACQUISITION DEVICE

[75] Inventors: Elvin S. Brumfield, Los Angeles; Edgar W. Kutzscher, Sherman Oaks; James N. Lovelady, Saugus, all of Calif.

[73] Assignee: Lockheed Aircraft Corporation, Burbank, Calif.

[21] Appl. No.: 523,179

[22] Filed: Jan. 26, 1966

[51] Int. Cl.² ............................ G01J 1/20; G01J 1/00
[52] U.S. Cl. ................................ 250/342; 250/203 R; 250/347; 250/349
[58] Field of Search .................... 250/199, 203, 203 R, 250/339, 342, 347, 349

[56] References Cited

U.S. PATENT DOCUMENTS

| | | | |
|---|---|---|---|
| 2,981,843 | 4/1961 | Hansen | 250/203 |
| 3,038,079 | 6/1962 | Mueller | 250/203 |
| 3,053,984 | 9/1962 | Hulett | 250/203 |
| 3,076,949 | 2/1963 | Anderson | 250/203 X |
| 3,090,869 | 5/1963 | Astheimer | 250/203 |
| 3,133,200 | 5/1964 | Collyer | 250/203 |
| 3,161,375 | 12/1964 | Ruhge | 250/203 |
| 3,204,101 | 8/1965 | Brumfield et al. | 250/203 X |
| 3,242,485 | 3/1966 | Astheimer | 343/6 |
| 3,268,185 | 8/1966 | Eckermann | 250/203 X |
| 3,305,686 | 2/1967 | Carter et al. | 250/203 |

Primary Examiner—S. C. Buczinski
Attorney, Agent, or Firm—Ralph M. Flygare

[57] ABSTRACT

An infrared acquisition device is described which surveys a relatively large field of view in which an emissive target is likely to appear. An optical system focuses an image of the target onto a mosaic of separate detectors arranged in concentric fields and so arranged that the appearance of the target image on the outer or peripheral field will reposition the optical system so as to move the image onto the inner or central field. Chopper means are provided for modulating the signal for processing into servo control signals and also for discriminating against background radiation.

10 Claims, 5 Drawing Figures

INFRARED ACQUISITION DEVICE

The present invention relates to an infrared target acquisition and tracking system and, more particularly, to apparatus for continuously scanning a field of interest in order to detect the presence of infrared emissive targets, and thereafter track said targets in order to continuously generate target position tracking signals which may be used by related apparatus such as a spectrometer for the purpose of analyzing the target's emissive spectrum.

A target acquisition device is necessary when an infrared spectrometer is to be used for analyzing the characteristics of a moving aerospace vehicle or re-entry body. The acquisition device must survey the entire area within which the target is likely to appear, acquire the target at the earliest possible moment, and finally direct the spectrometer to the target. Once the target is brought within the tracker field of view, the tracker must keep the spectrometer trained on the target. The apparatus of the present invention is particularly applicable to such a task; however, it can also be used for the acquisition of any other infrared target with which the spectrometer is to be used. The invention is not limited to use with a spectrometer, since the acquisition and tracking functions of the apparatus may be used for such other purposes as gun directing or missile tracking.

To facilitate the description of the present invention, a preferred embodiment will be described comprising an acquisition tracker having a field of approximately 12° and a fine tracker having a field of approximately 1¼° for use in connection with an infrared spectrometer. These field angles are by way of example only. The system of the invention utilizes a mosaic array of field lenses which is placed in the focal plane of a large objective lens. The mosaic comprises a plurality of lenses of mating shapes, joined edge to edge. If energy from a target is imaged on any field lens, it will be directed to a radiation detector behind that lens. A chopping disc is placed in front of the mosaic, also near the focal plane, so that an A-C signal will be generated by the detector. This signal is processed electronically to determine whether or not a target exists in the corresponding channel. A separate detector and electronic channel is provided for each mosaic element. A novel background modulator is also included in the invention in order to enhance the ability of the system to distinguish an acquired target from more or less uniform background radiations. The construction of this device will be described hereinafter.

When an infrared emissive target enters any channel a servo system will drive the apparatus so that the target can be acquired by the fine tracker. The fine tracker will then furnish error signals to the spectrometer servos so that the target can be tracked with the accuracy necessary to assure proper operation of the spectrometer or other utilization equipment. It will be apparent to those versed in the art that a system of the type to be described hereinafter may be constructed to have acquisition fields other than the exemplary case, and may be used to provide drive signals to apparatus other than a spectrometer.

An advantage of the present invention is that the entire acquisition field is continuously and simultaneously surveyed, the tracker will be automatically driven to the target line of sight very rapidly (typically within times of the order of one second) after a target is detected, and will provide servo control signals which are compatible with conventional and well-known servo positioning systems. Heretofore, the general function of the present invention has been performed by apparatus based upon a periscopic sextant. The present invention is superior to such prior apparatus in that it is able to detect a target more rapidly, will automatically acquire the target, and will eliminate the need for a human observer. If desired, however, the apparatus of the present invention may be provided with an ancillary periscopic sextant for visual acquisition by an observer whenever desired.

The preferred embodiment, described hereinafter, has been designed primarily for acquiring and tracking re-entry targets, since they are most difficult to acquire. A system based on this particular application will generally have rates, sensitivity, and a field which are more than adequate for other emissive targets.

It is then a principal object of the invention to provide novel and improved infrared emissive target acquisition and tracking apparatus.

Another object of the invention is to provide novel and improved infrared target acquisition and tracking apparatus for the positional control of a slaved infrared spectrometer.

Still another object of the invention is to provide an infrared target acquisition system having superior performance to apparatus employed heretofore for generally similar purposes.

Yet another object of the invention is to provide a novel and improved infrared target acquisition system employing novel mosaic detector and scanning apparatus.

Other objects of the invention will in part be obvious and will in part appear hereinafter.

To assure a high probability of success in the acquisition of a re-entry body by the spectrometer tracking system, it is necessary that the field of view of the acquisition system be large enough to include all of the most likely angular locations of the emissive body during the interval when acquisition must be accomplished. It is also necessary that the angular rate capabilities of the acquisition system be adequately high.

In most applications where a target is to be located within a large field of view, a multiple detector scanning search system is utilized to provide target position information. A system of this type is shown and described in U.S. Pat. No. 3,209,150 entitled "Coolable Multi-Element Infrared Detector Assembly" and assigned to the assignee of the present application. For the task of automatic target acquisition, as is the objective of the present invention, the high degree of resolution inherent in this prior type of device is unnecessary and requires an excessive information bandwidth as well as a relatively complex scanning system. In the present invention the acquisition problem is solved by means of a large field acquisition tracker which, in addition, has an integral fine tracker. These and other features of the invention will be understood more completely from the following detailed description, taken in conjunction with the drawings in which:

FIG. 1 diagrammatically illustrates the optical, scanning, and detecting elements of the acquisition system of the invention.

Figure 4:
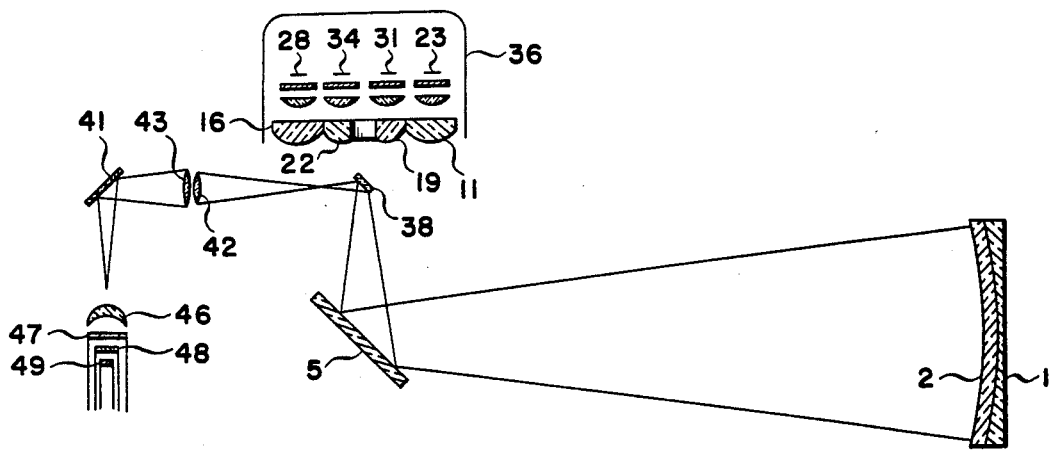

FIG. 4 diagrammatically illustrates the optical path of the "fine tracker" portion of the system.

Figure 5:
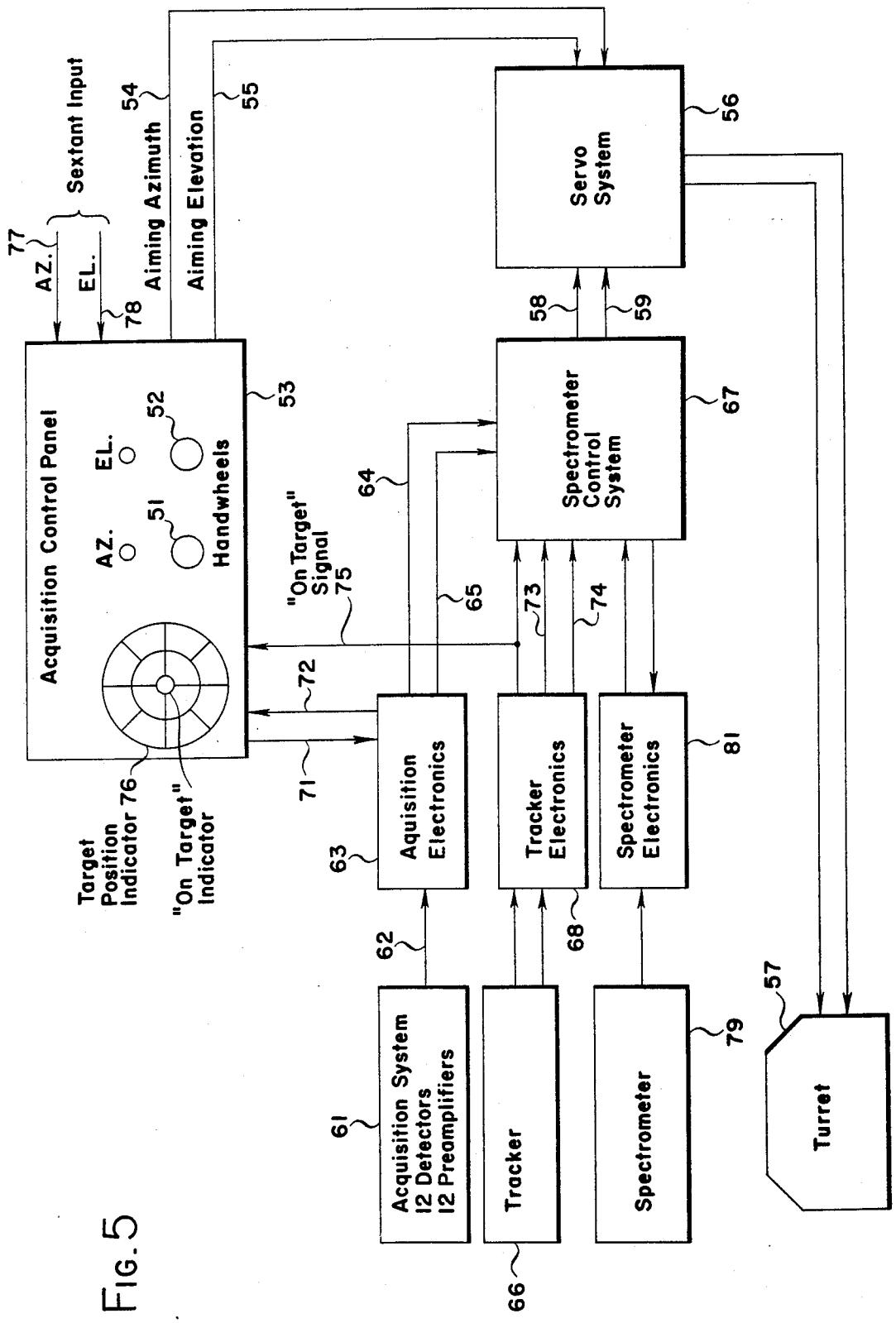

FIG. 5 is a block diagram of a complete system constructed in accordance with the invention.

Figure 1:
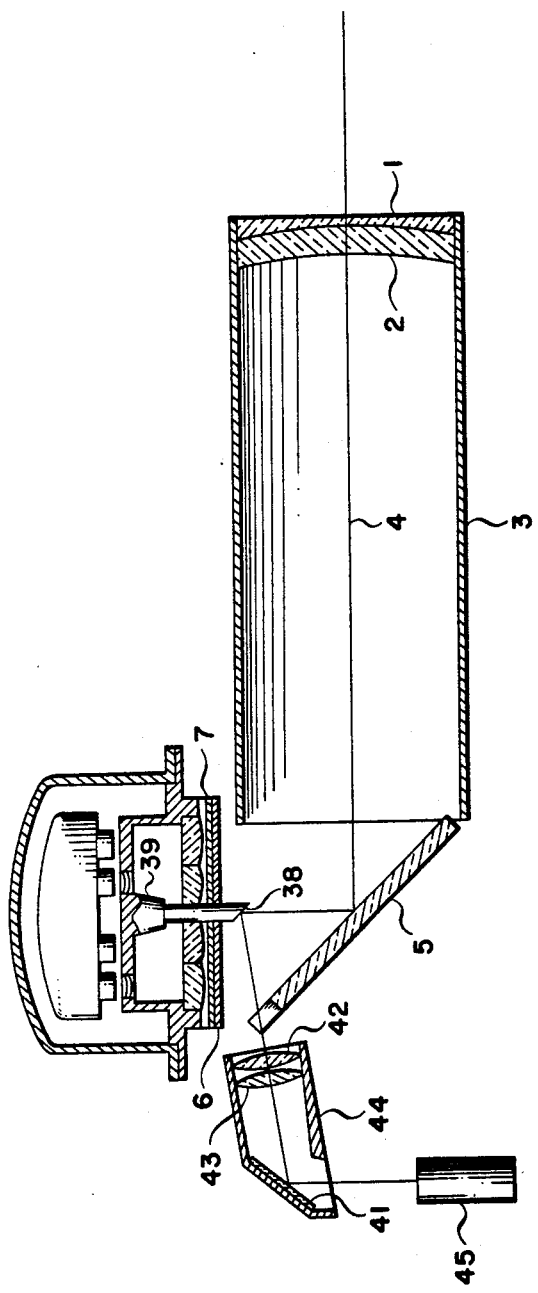

FIG. 1 illustrates the general arrangement of a typical embodiment of the acquisition system of the invention. In a typical construction the acquisition device of the invention will have a field of approximately 12°, a noise equivalent power density (NEPD) of $10^{-12}$ watts/cm$^2$ and a potential tracking accuracy of approximately 0.01°.

Figure 2:
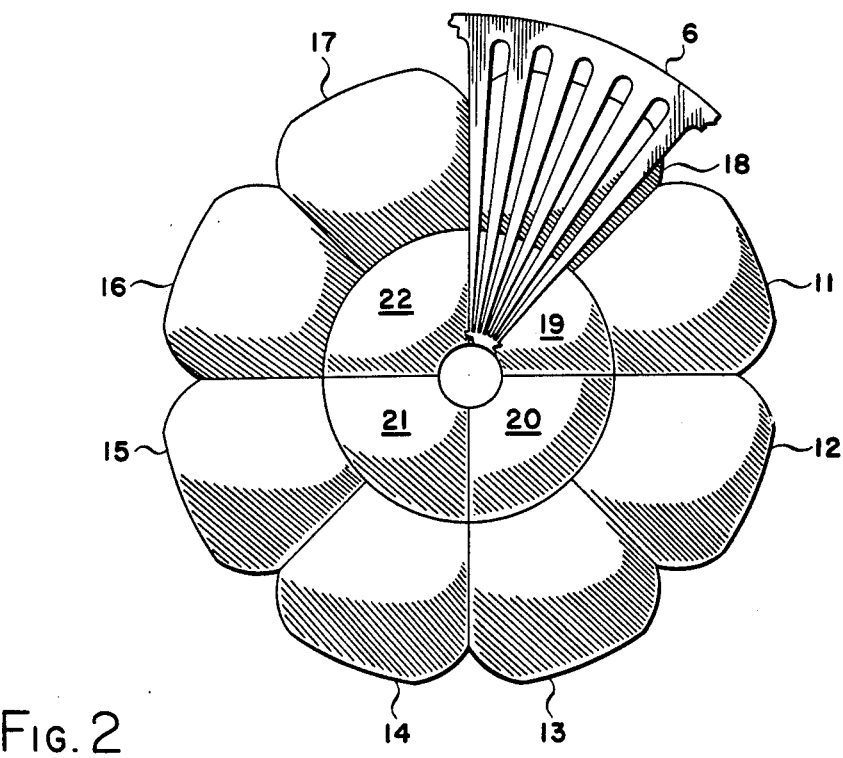
FIG. 2 is a plan view illustrating the mosaic arrangement of the field lenses, and also shows a fragment of the chopper disc.
Figure 3:
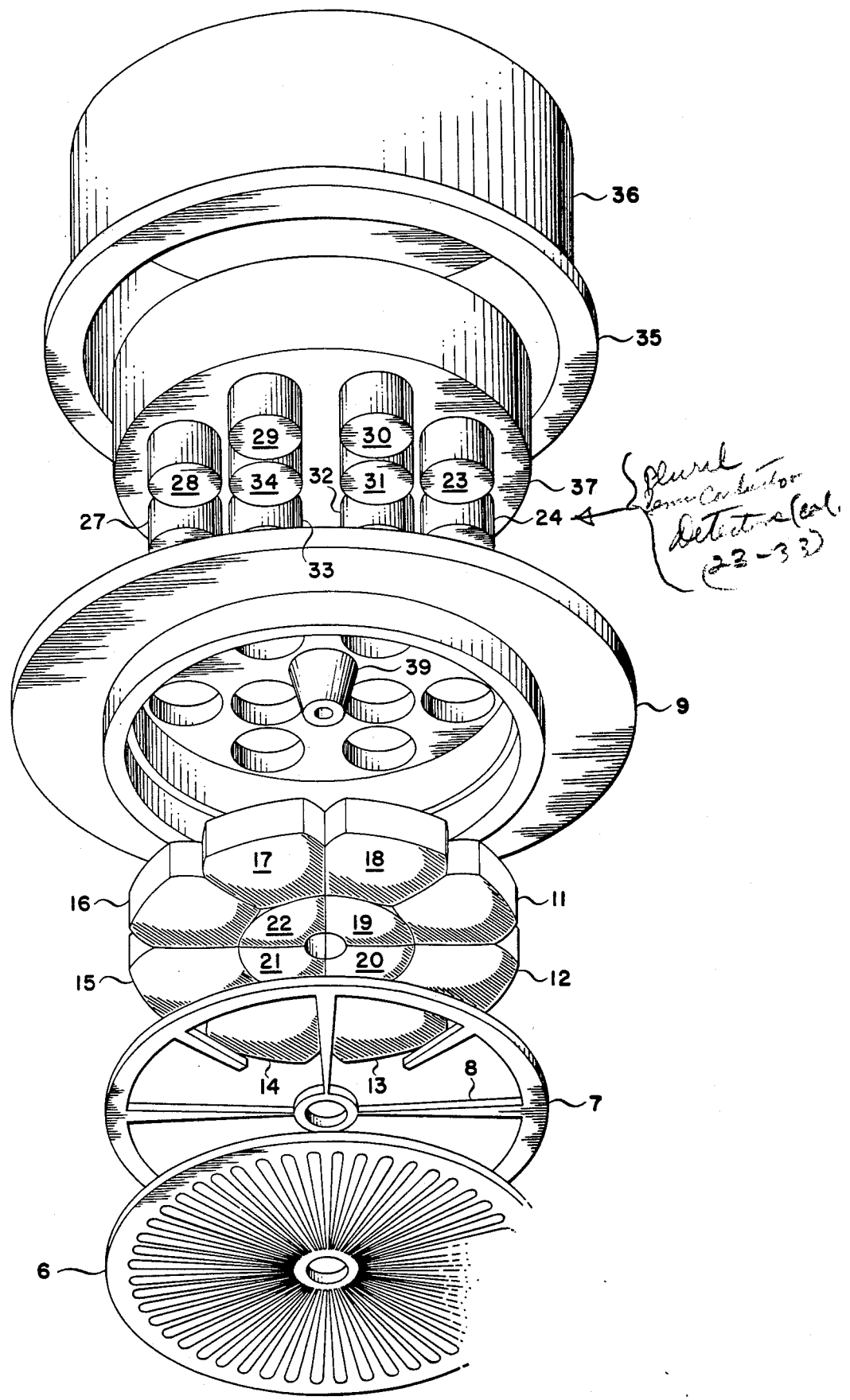
FIG. 3 is an exploded view of the acquisition tracker optical system.

The energy from the infrared emissive target is collected by a refractive optical system which may, for example, comprise lenses 1 and 2 which are supported in tube 3. The centerline of the optical path is indicated at 4. The incoming radiant energy is reflected by means of mirror 5 (which will be described more completely in connection with FIG. 4) which is oriented at a 45° angle with respect to the major axis of tube 3. This arrangement diverts the incoming rays onto chopper disc 6, which is concentric to the field of lenses 1 and 2. As can be seen in FIGS. 2 and 3, chopper disc 6 is provided with radially extending alternate bars and spaces of equal area. Chopper disc 6 is rotated at a uniform rate by any suitable motor means (not shown), as will be apparent to those versed in the art. Suitable chopper apparatus is shown and described in U.S. Pat. No. 3,177,362 entitled "Infrared Tracker", of common assignee herewith, and particularly with reference to FIG. 5 therein. Rotation of chopper disc 6 will modulate the energy from an incoming target at a constant frequency which, in a preferred embodiment, is 900 cycles per second, thus permitting the target signal to be detected as a continuous A-C signal.

Background modulation is also provided by means of reticle disc 7 which is coaxially located behind disc 6 and serves as the field stop or aperture for chopper disc 6. Reticle disc 7 is provided with a plurality of radial bars, one of which is indicated at 8 in FIG. 3, which are of smaller area than the radial spaces therebetween. Suitable drive means, not shown, is coupled to disc 7 for the purpose of cyclically rotating it in first one direction and then the other, through an arc distance approximately equal to the angular width of the space between the bars 8 of the disc 7. That is, the reticle disc 7 is rocked back and forth thereby shifting the aperture of the chopper disc 6 through an arc centered on the center of the chopper. This arrangement will permit discrimination against background or very large area emissive sources in a manner which will be more fully described hereinafter. A mosaic of field lenses 11–22 as shown in FIG. 2, are placed directly behind the reticle disc 7 to condense the chopped energy onto a number of infrared responsive detectors. The shape of lenses 11–22 combine to approximate a circle having an area which is co-extensive with the field.

Twelve infrared detectors, 23–34 (preferably indiumantimonide type (Insb)), each covering a 4° field, are located in a dewar housing at the point of energy concentration of the field lenses 11–22. A signal from any one of these detectors 23–34 will indicate the presence of an emissive target in the field of that particular detector. This locates the target relative to the overall field. Appropriate processing of these signals, as will be described more fully hereinafter, will yield error signals to drive the spectrometer servos so that the turret 57 (shown in FIG. 5) carrying the optical system (elements 1–39 and 41–49) will slew toward the target. As the line of sight of the optical system moves toward the target, the target image will move from the peripheral sector (11–18) on which it was first detected toward an adjacent one of the four central sectors (19–22) of the detector array. Signals from the central sectors will then control the positioning of the target energy onto the fine tracker.

As shown in FIG. 3, field lenses 11–22 are mounted within aperture plate 9, which in turn is secured to flange 35 at the base of housing 36. Detectors 23–34 are mounted on Dewar assembly 37 which maintains the desired operating temperature of the detectos. The entire structure, including housing 36, may be mounted on any suitable support means such as a selectively positionable turret 57. The electrical signal processing circuits (53 and 63) and the utilization apparatus (67) to which the detectors (23–34) are connected, may be remotely located.

Once the target energy has been focused onto one or more of the four central sector detectors (19–22), the fine tracker portion of the system becomes operative. A small, flat mirror 38 is mounted on support post 39 extending from the center of the aperture plate 34 and reflects the target energy from the central 1½° of the field to the fine tracker optical system.

FINE TRACKER

The fine tracker receives target energy from the center of the field of the acquisition tracker by means of two flat mirrors 38 and 41, and a relay lenses 42 and 43. Relay lenses 42 and 43, and mirror 41, are mounted within housing 44, as shown in FIG. 1. In a preferred construction, the fine tracker has an effective focal length of 40 inches and a field of view of 1.5°. The energy from a target in the field of view of the fine tracker is modulated by a rotating-nutating reticle which produces A-C signals at a single InSb detector 45. A fine tracker which is particularly suitable for use in the present invention is shown and described in U.S. Pat. No. 3,204,101 entitled "Infrared Spectrometer for Target Detection and Tracking" and of common assignee herewith. These signals are amplitude modulated (A-M) when a target is in the outer 1° of the field of view and frequency modulated when a target is in the central ½° field of view. This "dual mode" technique assures a very high degree of tracking accuracy, together with high sensitivity of the system.

The A-M signal is generated in the form of a pulse train whose phase determines on which radius of the field the target image is located. This information is inadequate for fine tracking, but requires only a narrow bandwidth and is sufficient to drive the tracker to the central ½° of the field.

The F-M signal produced in the central ½° of the field yields, after demodulation, an A-M signal whose phase again determines which radius of the field on which the target image is located, but whose amplitude is now only a function of the distance off boresight (viz. optical centerline 4). This signal then contains enough information to define each point of the field and is therefore capable of producing accurate proportional error signals. The bandwidth of the F-M signal increases nearly exponentially with the field. As a result, the signal is developed only over the center of the field, thus increasing the sensitivity by conserving bandwidth, while increasing the tracking accuracy on axis, where it is necessary.

The scanner mechanism, the detector dewar, and the field lens assembly are described in detail in the above-mentioned U.S. Pat. No. 3,204,101 the disclosure of which is incorporated herein by reference. However, there is shown in FIG. 4 the field lens 46, Dewar windows 47 and 48, and InSb element 49.

OPTICAL SYSTEM

The objective lenses 2 and 1 of the optical system may comprise a 6-inch f/4 silicon lens system having radii of 93 and 156 inches, respectively. While silicon is preferred, it should be understood that other suitable materials may be employed, as will be apparent to those versed in the art. The re-imaging lenses 42 and 43 for the fine tracker may be fabricated from either silicon or germanium. In a practical construction the field lens 46 may be a singlet.

The major mechanical elements comprising the tracker optics may be enclosed within the spectrometer turret 57. By including the acquisition system in the spectrometer turret, the need for an additional turret, with associated drives and inter-turret connections will be eliminated. Reference should be made to the previously mentioned U.S. Pat. Nos. 3,177,362 and 3,204,101 for further details of a turret and servo drive assembly suitable for use in connection with the target acquisition system of the present invention.

DETECTORS

Re-entry measurements of typical missiles indicate that a few seconds before nose cone temperatures are high enough for detection with a lead sulphide cell, the target can be acquired by means of other detectors which are sensitive to longer wavelengths. It is preferred, therefore, to employ either lead selenide (PbSe) or indium antimonide (InSb) detectors (23-33) to assure early acquisition of such targets. The selection of a particular detector material also depends upon such other significant factors as the ability to discriminate against background radiation. This characteristic is determined by the detector's effective wavelength region and the wavelength regions in which scattered sunlight and self-emission occur in the atmosphere. In a preferred embodiment InSb or PbSe operating at liquid nitrogen temperature is used.

A simple liquid nitrogen cooling system is used to maintain the detectors at the proper operating temperature. The detectors are integrally mounted in a dewar assembly 37 of the type shown and described in U.S. Pat. Nos. 3,204,101 and 3,209,150. The fine tracker may use the cooling finger of the spectrometer tracker with its associated liquid nitrogen reservoir.

ACQUISITION TRACKER

As stated hereinabove, the acquisition tracker employs continuous chopping and multiple detectors. Practical considerations relating to a preferred embodiment indicate that a 9 cycle per second bandwidth at 900 cycles per second is about minimum. This bandwidth then suggests a 4° field for each detector element 11-22. Since in the preferred system a 12° field is desired, twelve detectors 11-22 in the pattern shown in FIG. 2 are employed. It should be understood, however, that particular application requirements may dictate other design configurations and the present invention should not be construed as being limited to the specific mosaic pattern shown and described. It is merely necessary that the mosaic comprise a centrally disposed group of contiguous detectors surrounded by an annularly disposed group of detectors. This will provide continuous chopping and a coarse indication of the off-boresight target position error. The reduction of this off-boresight error to an area coextensive with a single element of the mosaic will bring the apparatus within the field of the fine tracker.

OPERATION

There is shown in FIG. 5 a block diagram of an acquisition, tracker, and spectrometer system incorporating the acquisition device of the invention. As stated hereinabove, a typical application of the system relates to the analysis of radiation from re-entry bodies of ballistic missiles. At the outset of a mission, the approximate trajectory during the impact phase is known. Prior to the expected impact the entire system is put in the standby mode. During the interval before the tracking run the expected re-entry position coordinates (azimuth and elevation) are manually entered into the aiming subsystem by means of azimuth handwheel 51 and elevation handwheel 52, both of which are located at the acquisition control panel 53. At some time prior to the earliest probable impact, the system is placed in the acquire mode. Immediately after the mode control is established, the spectrometer-tracker assembly, mounted on turret 57, slews to the commanded azimuth and elevation coordinates in response to signals appearing on lines 54 and 55 to the servo system 56. An azimuth and elevation servo-controlled platform or turret, together with the necessary circuitry, suitable for use in the present invention is shown in U.S. Pat. No. 2,713,134 entitled "Radiant Energy Controlled Follow-up System," as well as in the aforementioned U.S. Pat. Nos. 3,177,362 and 3,204,101. During the slewing interval, means actuated by the aiming error signals on lines 58 and 59 may be used to prevent acquisition of any target which passes through the acquisition field of view.

Once the system is at or very near the expected acquisition position, automatic acquisition becomes possible. The energy incident upon one of the twelve acquisition detectors of system 61 will be chopped at about 1,000 cps, provided it comes from a sufficiently small angular source. After pre-amplification and filtering the resultant wavetrain on line 62 will be amplified and applied to a threshold detector in acquisition electronics 63. This detector determines whether or not the signal amplitude is sufficiently above the average noise amplitude coming from the detector and amplifier 61 to have a high probability of being the desired target. This occurs at a signal-to-noise ratio of about 3:1. When the signal exists, a tracker angular rate circuit will be activated.

The angular rate circuit has two outputs 64 and 65, one of which 64 provides an elevation drive rate signal and the other of which 65 comprises an azimuth drive rate signal. These signals have amplitudes such that their vector sum corresponds to the direction from the center of the acquisition detector field of view to the center of the fine tracker 66 field. These signals 64-65, together with any signal from all of the other acquisition detectors, are applied to elevation and azimuth differential amplifiers in the spectrometer control system 67.

The outputs of the differential amplifiers are fed into the spectrometer-tracking servo system 56 stabilization loop as angular rate commands to the spectrometer drive servos. The rates are selected such that, if only one detector is irradiated, the system will quickly slew the target image to the fine tracker field or to another detector element nearer to the fine tracker deflection mirror 38 (see FIGS. 1 and 4). The tracker 66 signals are supplied to the spectrometer control system 67 and the servo system 56, via tracker electronics 68. In the event that two adjacent detectors receive target energy, the vector addition of the rate signal outputs will cause the system to slew in a direction parallel to the common boundary and toward the fine tracker field, or further into the detector whose center is closer to that field.

The only way in which two non-adjacent detectors could be irradiated would be in the event that two targets of sufficient energy output were present, separated by an angular distance of more than approximately 3½°, but both of which are within the field of view of the acquisition tracker 66. In such an event, the system will tend to slew to the mid-position between the two targets. In practice, such a condition is extremely unlikely.

When the image of the target reaches the fine tracker field, a signal is developed on lines 71 and/or 72 which actuates a control switching means in the acquisition control panel 53. This switching means transfers control of the spectrometer-tracking servo system 56, via line 75, to the fine tracker azimuth and elevation aiming synchro control transmitter signals on lines 54 and 55. Also, this switching means disables all inputs to the servo system 56 from the acquisition system 61, thus preventing additional targets or unusually large noise pulses from disturbing tracking of the target which has been acquired by the fine tracker 66. If the target image initially falls on the fine tracker 66, the acquisition system 61 functions will be bypassed to the point, indicated hereinabove, at which the image reaches the fine tracker field.

The effect of uniform background radiation upon chopper systems of the prior art has been to generate spurious signals as a result of interaction between the field stop and the chopper wheel. The "aperture chopping signal" is a roughly sinusoidal voltage whose amplitude is determined by the shape of the field stop and whose phase is determined by relative positions of the chopper wheel and the field stop. If the aperture were to be rotated about the center of the chopper wheel, the frequency of the aperture chopping signal would be proportional to the difference in rotational speeds between the aperture and the chopper. If the aperture is rocked back and forth, the resulting signal will be phase (or frequency) modulated by the rocking motion. This modification of aperture chopping signal permits it to be separated from desired target signals since the spurious aperture chopping signal may be made to fall outside the passband of the data signal transmission system.

Referring again to FIG. 3, the reticle disc 7 cyclically oscillates back and forth through a small angle. This will result in the modulation of signals generated by the twelve detectors of the acquisition detector array in response to target images which are larger in area than the area between the bars of the reticle disc 7. This modulation frequency differs from the modulation frequency of a small-area target as chopped by chopper disc 6. The acquisition electronics 63 can distinguish between large-area signals generated in response to background radiation, from small-area signals generated in response to a target of interest, by reason of the two different modulation frequencies. Appropriate band-pass filters may be used to separate these two frequencies. In this way a high degree of discrimination between target and background may be achieved.

Summarizing the operation of the system, if a target image appears in the field of view of one of the twelve acquisition detectors 61, the signal from that detector will be amplified, filtered, and applied to a threshold detector 63. If the signal is sufficiently greater than the noise level, the threshold detector generates three types of signals; if it is not, there is no output from the threshold detector. One signal serves to light an appropriate one of twelve indicator lamps on the "Target Position Indicator" 76 on the acquisition control panel 53 to show which of the twelve detectors has been activated. That is, each of the target zone signals will illuminate its own indicator lamp 76 when a target appears in that particular zone. The other two signals from the threshold detector 63 are applied to the spectrometer servo system 56 via control system 67. These signals comprise an elevation drive-rate signal and an azimuth drive-rate signal of such amplitudes and polarities that their vector sums correspond to the direction from the center of the field of view of the particular detector to the center of the tracker field. The drive-rate signals from all twelve channels are added vectorially and fed into the spectrometer tracker servo system stabilization loop, thus acting as angular rate command to the spectrometer drive servo 56. The rates are so chosen that if only one detector is illuminated, the system will quickly slew the target to the tracker field or to another detector nearer to the tracker deflection mirror.

In the event that two detectors are illuminated, the vector addition of the rate signal output will cause the system to either slew in a direction parallel to the common boundary and toward the tracker field 66, or further into the detectors whose center is closer to that field.

The signals which light the acquisition indicator 76 are also routed to a relay which disables the synchro aiming signals appearing on lines 54 and 55. Thus, the handwheels 51 and 52, or manual sextant signals on lines 77 and 78, will control the spectrometer 79 position until a target appears in the field of view of the acquisition system 61, at which time the acquisition system 61 takes over complete control.

In the same fashion, an "on target" signal from the tracker 66 is used to transfer control from either synchro aiming signals 54 and 55 or the acquisition system 61 to the tracker 66. All input drive-rate signals from the acquisition system 61 are disconnected so that large noise pulses or extraneous targets will not disturb the tracking of the target which has been already acquired.

In the event that two nonadjacent detectors generate a signal, the operator may choose between the two targets by target selection means which is incorporated into the target position indicator 76. If two positions are lighted on indicator 76, the operator may select either channel and disable all other channels. He must follow the selected target from one detector to the next until it is within the tracker field of view. It is unlikely that two targets in nonadjacent cells will often occur simultaneously.

The spectrometer electronics 81 function in a conventional manner, and form no part of the present invention. It should be understood that the spectrometer 79 and its related components 81 comprise the ancillary equipment which would be deleted from the system shown in FIG. 5 for other applications of the invention.

Since certain changes may be made in the above described apparatus without departing from the scope of the invention herein involved, it is intended that all matter contained in the above description or shown in the accompanying drawings shall be interpreted as illustrative and not in a limiting sense. For example, the acquisition device need not be incorporated into a spectrometer and its associated fine tracking system. Also, the mosaic detector array may be altered to contain either a larger or smaller number of detector elements, than employed in the exemplary case, as required for a particular application.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention; therefore, it is intended that the invention be limited only as indicated by the scope of the following claims.

What is claimed is:

1. Acquisition apparatus responsive to an infrared emissive target within a given field of view, comprising:
   a first array of infrared energy responsive detectors radially disposed in a common plane about a common center;
   a second array of infrared energy responsive detectors annularly disposed with respect to said first array of detectors and coplanar therewith;
   optical means for collecting and focusing infrared energy from said given field of view onto an image plane coplanar with said first and second arrays of detectors;
   positioning means movably carrying said optical means and responsive to signals generated by infrared energy from said target impinging upon a detector of said second array to reposition said optical means to cause the energy from said target to be directed onto a detector of said first array and away from a detector of said second array.

2. Acquisition apparatus as defined in claim 1 wherein said first array of detectors includes four radially disposed coplanar arcuate sectors each comprising:
   an infrared-responsive cell; and
   a field lens for directing incoming infrared energy onto said cell.

3. Acquisition apparatus as defined in claim 2 wherein said second array of detectors includes eight coplanar peripheral sectors annularly disposed with respect to said arcuate sectors and each comprising:
   an infrared-responsive cell; and
   a field lens for directing incoming infrared energy onto said cell.

4. Acquisition apparatus as defined in claim 1 including:
   target image chopper means interposed between said target and said arrays for modulating the energy from said target at a first constant frequency.

5. Acquisition apparatus as defined in claim 4 including background modulating means comprising:
   an oscillatory field stop coaxially disposed with respect to said common center and adapted to rotate in first one direction and then the other for modulating all of the infrared energy passing through said optical means at a second frequency differing from said first frequency.

6. Acquisition apparatus as defined in claim 1, wherein said positioning means comprises:
   azimuth and elevation servo drive means for directing said optical means to maintain substantially continuous coincidence between said targets' line-of-sight and the line-of-sight of the detectors of said first array.

7. Acquisition apparatus as defined in claim 1 wherein said optical means comprises:
   an infrared-transparent objective lens movably carried by said positioning means; and
   a mosaic of individual infrared-transparent field lenses interposed between said objective lens and said arrays at the focal plane of said objective lens, there being a corresponding one of said field lenses for each one of the detectors comprising said arrays.

8. Acquisition apparatus as defined in claim 1 including:
   control means responsive to signals generated by infrared energy from said target impinging upon the detectors of said first array to provide azimuth and elevation aiming signals for control of utilization equipment to which said apparatus is connected.

9. The method of locating a radiant energy emissive target within a given field of view comprising the steps of:
   dividing said given field of view into two concentric coplanar viewing zones, one within the other;
   subdividing each of said viewing zones into a plurality of contiguous viewing sectors;
   focusing an image of said emissive target onto an image plane which is coplanar with said viewing zones;
   generating a control signal in response to radiant energy from said emissive target imaged upon any one or more of said sectors, said control signal being identifiable with the corresponding one or more of said sectors upon which a target image falls;
   slewing said field of view, in response to the generation of a control signal at any one of said sectors in the outer one of said viewing zones, in a direction which will cause the energy from said target to impinge on an adjacent one of said sectors in the inner one of said viewing zones; and thereafter,
   shifting the center of said field of view to substantially coincide with the common center of the sectors comprising said inner viewing zones.

10. The method of locating a radiant energy emissive target as defined in claim 9 including the steps of:
    cyclically modulating the radiant energy impinging on the total area of said viewing zone, at a first frequency;
    continuously modulating any viewed radiant energy which is substantially confined within a viewing area which is within the area of a single one of said sectors, at a second frequency differing from said first frequency; and
    separating said first frequency from said second frequency in order to discriminate target-emitted radiant energy from background radiant energy in the step of generating said control signal.

* * * * *